US010872232B2

(12) United States Patent
Gupta et al.

(10) Patent No.: US 10,872,232 B2
(45) Date of Patent: Dec. 22, 2020

(54) IMAGE FILTERING FOR SUBJECT AND CROWD IDENTIFICATION

(71) Applicant: Adobe Inc., San Jose, CA (US)

(72) Inventors: Subham Gupta, Uttarakhand (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 158 days.

(21) Appl. No.: 16/195,580

(22) Filed: Nov. 19, 2018

(65) Prior Publication Data
US 2020/0160039 A1    May 21, 2020

(51) Int. Cl.
*G06K 9/00*    (2006.01)

(52) U.S. Cl.
CPC ..... *G06K 9/00288* (2013.01); *G06K 9/00228* (2013.01); *G06K 9/00268* (2013.01)

(58) Field of Classification Search
CPC ...................... G06K 9/00281; G06K 9/00288
See application file for complete search history.

(56) References Cited

U.S. PATENT DOCUMENTS

2017/0228453 A1* 8/2017 Gupta ................ G06K 9/00288
2018/0107660 A1* 4/2018 Wang ...................... G06F 16/10

OTHER PUBLICATIONS

Adobe, "Video: Use Facial Recognition to Organize Your Photos", https://helpx.adobe.com/lightroom/help/face-recognition.html, 2018, accessed Nov. 19, 2018, 7 pages.

* cited by examiner

*Primary Examiner* — Ross Varndell
(74) *Attorney, Agent, or Firm* — Kilpatrick Townsend & Stockton LLP (57) ABSTRACT

Systems and methods disclosed herein for providing people categorization within electronic images. One embodiment involves retrieving an input image from memory. The embodiment further involves determining one or more facial regions in the input image using a facial detection algorithm. The embodiment further involves identifying a number of features for each facial region. The embodiment further involves determining a subject face and a crowd face in the input image based on at least the number of features for the subject face being more than the number of features for the crowd face. The embodiment further involves displaying, on a display device, the subject face identified within the image.

17 Claims, 6 Drawing Sheets

IMAGE FILTERING FOR SUBJECT AND CROWD IDENTIFICATION

TECHNICAL FIELD

This disclosure generally relates to image processing. Specifically, this invention relates to processing images to facial recognition and categorization.

BACKGROUND

Facial recognition is used in the photography world in order to categorize photos and group them by facial recognition. These systems detect faces in large sets of photographic images and classify the images by unique persons to identify sets of images associated with each identified person. However, existing solutions suffer from the problem of identifying and classifying people that are part of the crowd or background while the image is being captured that are of no interest to the person trying to classify images. Faces other than the intended subject faces in photographs get detected as people in the image and are identified for the creation of image sets.

Existing implementations ignores user interest and context within the image in identifying unique persons to classify. As a result, users currently go through a manual process in unmarking and hiding these undesired crowd faces, resulting in a negative user experience.

SUMMARY

Systems and methods disclosed herein provide people categorization in electronic images. One embodiment involves retrieving an image for processing by the people categorization engine. In this embodiment, facial regions are identified by a face detection algorithm. Further in this embodiment, facial feature analysis is performed to determine a score for each facial region identified by the face detection algorithm. Crowd faces and subject faces are determined based on the scoring the number of facial features for each facial region. The subject faces are then used to categorize images which are displayed to the user.

In additional embodiments, the crowd faces and subject faces identified by the people categorization engine are used to process additional images in an image set to properly categorize facial regions as subject faces and crowd faces.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following detailed description is read with reference to the accompanying drawings.

DETAILED DESCRIPTION

Current people categorization algorithms are able to identify faces within photographic images and identify unique faces, but do not distinguish between subject faces and crowd faces. As a result, crowd faces within images get categorized and must be manually removed by users. As disclosed herein, certain embodiments use facial feature identification and information collected across sets of images to provide context of identified faces by determining the faces are the intended subject of the image as opposed to faces that were incidentally captured as part of the background. This allows certain embodiments to filter out crowd faces automatically in while performing people categorization to group pictures by identified faces.

Certain embodiments involve filtering out crowd faces in images through facial recognition. This may be accomplished by using facial feature analysis in order to determine a score for each face identified by facial recognition in an image. Crowd faces are faces that the user does not wish to have people categorization performed on. For example, in a picture taken of a person with strangers passing by in the background, faces within that crowd may be captured and identified through facial recognition. Subject faces are non-crowd faces, or may alternatively be defined as faces the user intends to be categorized.

To remove crowd faces from being categorized, a crowd filtering operation is performed, where crowd faces are filtered and removed from the list of identified persons within the image. In an example, an image containing a subject face and a crowd face is processed to identify and categorize faces in the image. The identification of faces in the image is accomplished using a facial detection algorithm. In one embodiment, scores may be generated for the faces identified based on the number of facial features using a modified ORB (Oriented Fast Rotated Brief) algorithm. The resulting scores are then filtered using k-means clustering to separate faces into subject and crowd faces. After the faces are separated into subject and crowd faces, in certain embodiments the results are saved for use in further analysis. In certain embodiments, the results or portions of the results (such as just the subject faces) are displayed to the user.

This solution provides a technical benefit to existing image categorization systems by using the context of whether a face is an intended subject or an incidental background face to automatically filter out crowd faces without user intervention. The user experience of these systems is improved by removing the need to manually filter out improperly categorized crowd faces.

Figure 1:
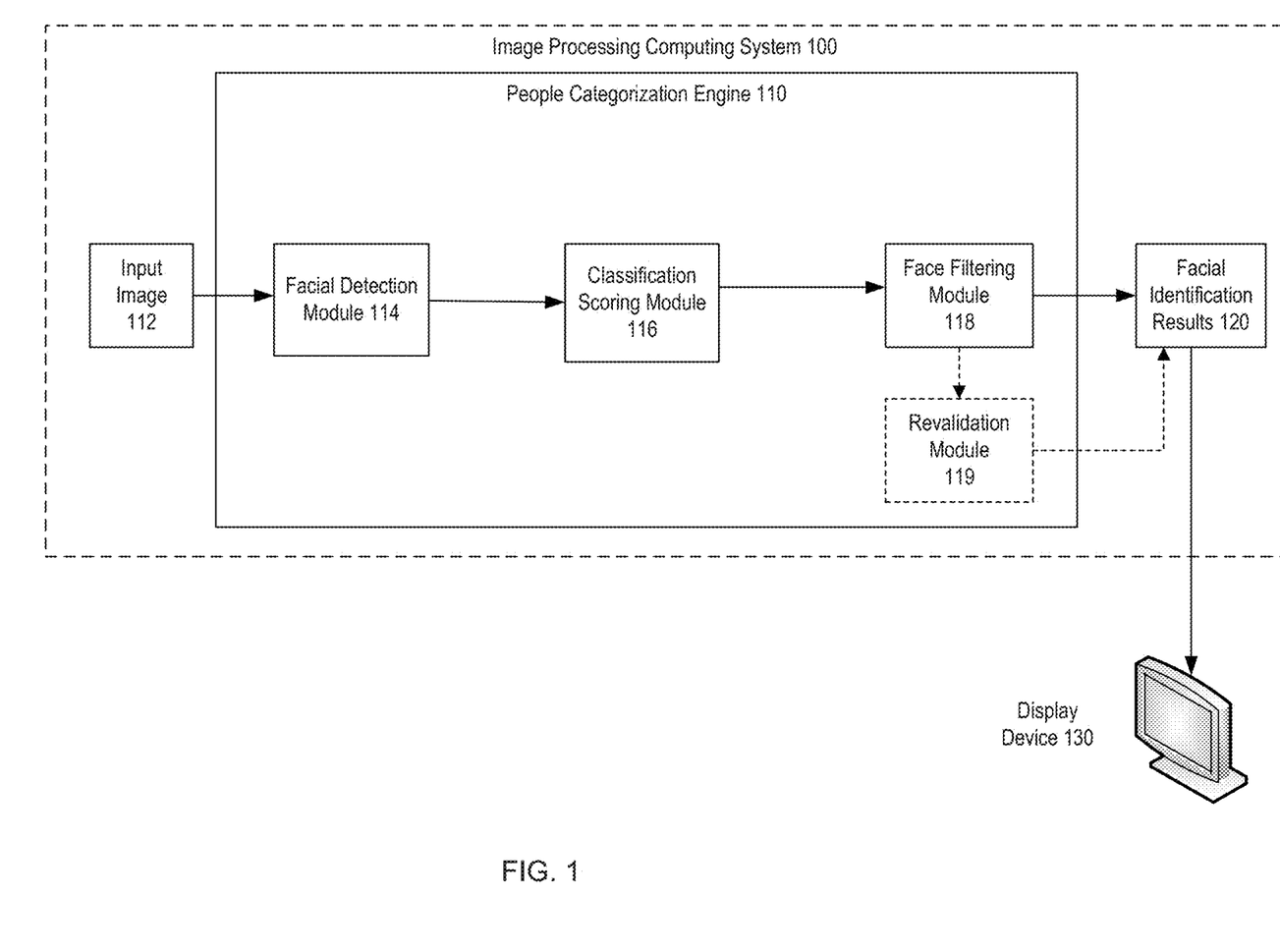
FIG. 1 depicts an example of an image processing computing system that performs crowd face filtering of images, according to certain embodiments of the present disclosure.

FIG. 1 depicts an example of an image processing computing system 100 that performs people categorization using facial recognition, according to some embodiments of the present disclosure. In this example, the image processing computing system 100 executes a people categorization engine 110 that accesses an input image 112 and generates results 120 identifying the subject and crowd faces in the input image 112. The people categorization engine 110 uses facial detection along with feature identification to identify the subject and crowd faces in the input image 112. The identified subject and crowd faces are results 120 used as output and may be displayed on a display device 130.

The people categorization engine 110 processes the input image 112 using a facial detection module 114. The facial detection module 114 creates a list of each face found in an image. The facial detection module provides the list of faces found in the image to the classification scoring module 116. In some embodiments, the facial detection module uses the Adobe face detection API to generate the list of faces found in an image. In alternative embodiments, the facial detection module may use a Viola-Jones Framework or Edge Orientation Matching to perform face detection.

The classification scoring module 116 processes the list of faces to assign a score to each face based on a feature identification algorithm. Prior to scoring, the classification scoring module 116 normalizes the facial regions by resizing the facial regions such that they are the same size. A feature is an attribute in an image that is used in combination with other features to describe the content of the image. In facial feature detection, features are attributes used in combination with other features to identify the person in an image. In some embodiments, the feature identification algorithm is a modified ORB (Orient Fast Rotated Brief) algorithm. Specifically, the ORB algorithm traditionally uses a pyramid representation to generate ORB features across multiple levels of smoothing and sampling. In some embodiments, this algorithm is modified to only be performed on the base layer of the pyramid, which is the layer with the highest sampling rate. Other feature identification algorithms that may be used include SIFT (Scale Invariant Feature Transform), SURF (Speed Up Robust Feature), or Haar-like feature detection. A score is assigned to each face based on the feature identification algorithm, and faces where more features are identified receive a higher score. The list of faces found in the image and corresponding scores are provided to the face filtering module 118.

The face filtering module 118 processes the list of faces and corresponding scores to filter out faces. The face filtering module 118 separates the list of faces into high scoring and low scoring faces. The high scoring faces are filtered out, and the remaining low scoring faces are stored in a separate list to be categorized as crowd faces. The crowd faces are then removed from the complete list of faces, and the remaining faces are categorized as subject faces. In other embodiments, low scoring faces can be filtered out, and the remaining high scoring faces are stored in a separate list to be categorized as subject faces. The output results 120 of crowd faces and subject faces are provided to other modules for use. In some embodiments, the identified crowd and subject faces are displayed to the user on a display device 130.

In some embodiments, the revalidation module 119 uses the output results to revalidate the results of previously processed images. For example, in a previously processed image, a face was scored and identified as a crowd face. In a subsequent image, the same face is scored and identified as a subject face. This result can be used to correct the earlier identification, and the face in the previously processed image can be properly identified as a subject face. In an alternative embodiment, a face can be identified as a crowd face, but the results from a previously processed image may correct this determination and cause the face in the currently processed image to be categorized as a subject face. The revalidation processed described can be used to remove false negatives, or faces improperly categorized as crowd faces.

Figure 2:
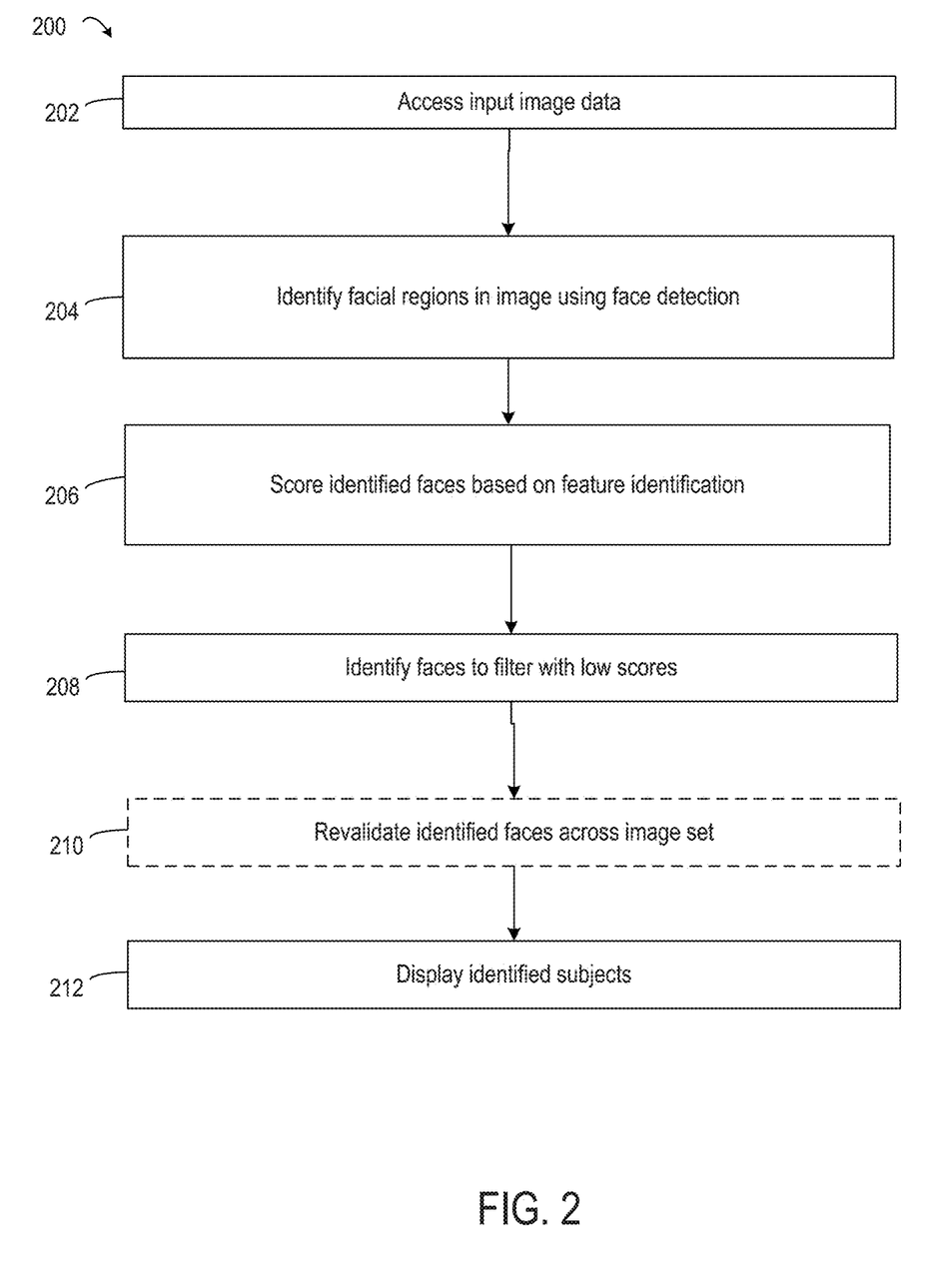
FIG. 2 depicts an example of a process for crowd face filtering of images, according to some embodiments of the present disclosure.

FIG. 2 illustrates an example of a process 200 for performing people categorization using facial recognition, according to some embodiments of the present disclosure. A processing device is illustrated as implementing the operations of the process 200. Instructions for performing the operations of the illustrative flow can be stored as computer-readable instructions on a non-transitory computer-readable medium of the people categorization engine 110. As stored, the instructions represent programmable modules (e.g., the facial detection module 114 and the classification scoring module 116) that include code or data executable by one or more processing devices. The execution of such instructions configures the people categorization engine 110 to perform the specific operations shown in the figures and described herein. Each programmable module in combination with the processor represents a means for performing a respective operation. While the operations are illustrated in a particular order, it should be understood that no particular order is necessary and that one or more operations may be omitted, skipped, reordered, or some combination thereof.

At operation 202, the people categorization engine 110 accesses input image data. The input image data could be an input image 112 or image data derived from the input image 112. For example, the people categorization engine 110 configures one or more processing devices to retrieve the input image data from a non-transitory storage medium. The non-transitory storage medium can be local to the image processing computing system 100 or remotely accessible via one or more data networks.

At operation 204, the people categorization engine 110 determines, from the image data, faces in the input image that will be categorized. For example, the people categorization engine 110 can use the facial detection module 114 to perform facial detection techniques such as the Adobe face detection APIs to determine one or more faces to be scored to determine subject and crowd faces. In alternative embodiments, the facial detection module may use a Viola-Jones Framework or Edge Orientation Matching to perform face detection. The identified faces can be stored in a linked data structure, such as a vector or linked list (e.g. V(f)) for further processing.

At operation 206, the people categorization engine 110 determines scores for each face identified by the facial detection module 114. For example, people categorization engine 110 can use the classification scoring module 116 to provide a score for each face in V(f). The score for each face is based on the number of features identified through feature detection. The classification scoring module 116 can use feature detection algorithms such as a modified version of ORB to perform feature detection. Other feature detection algorithms, such as SIFT or SURF, may also be used. In order to score each face based on feature detection, the classification scoring module may perform the steps in FIG. 3.

Figure 3:
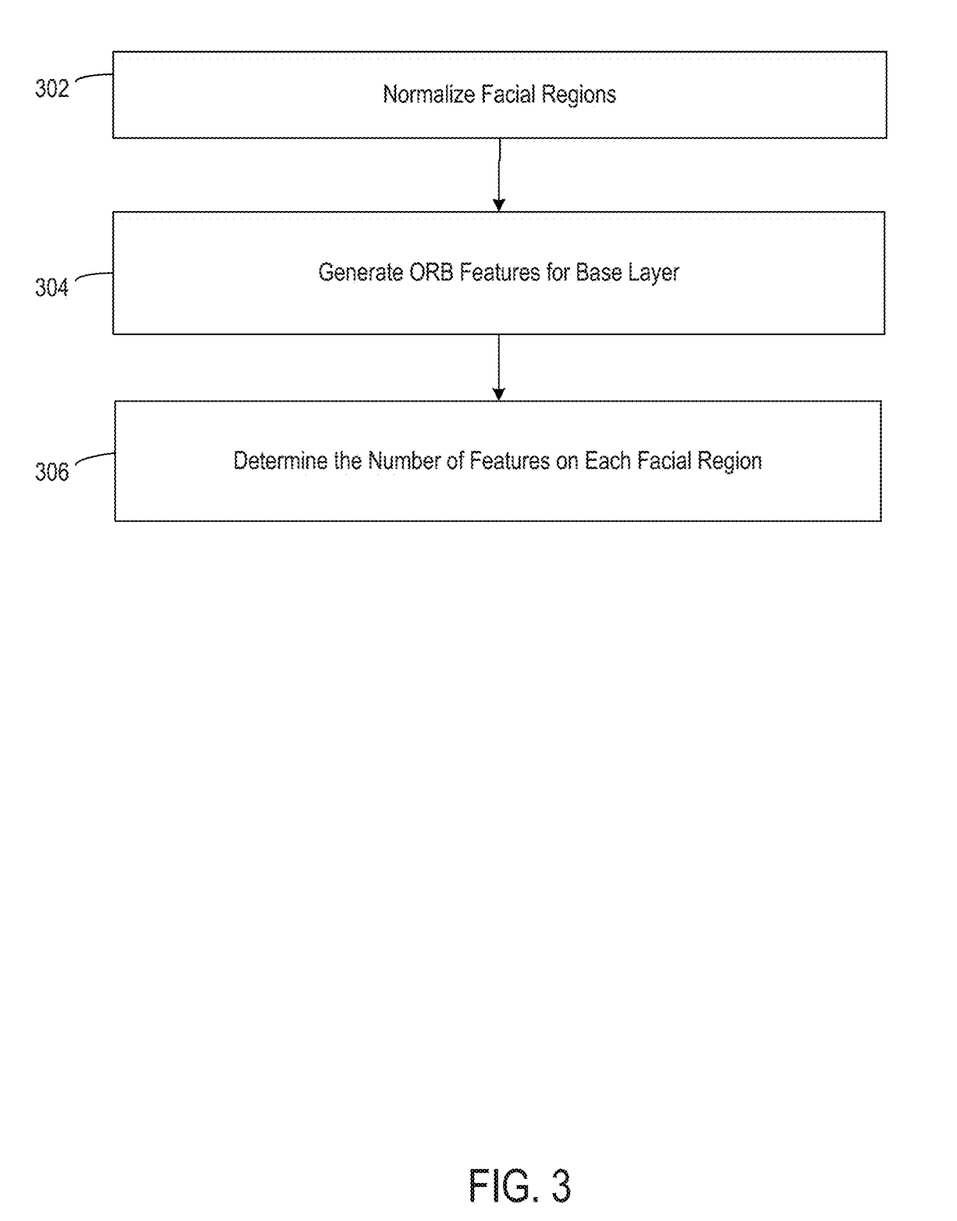
FIG. 3 depicts an example of a process for face classification scoring, according to some embodiments of the present disclosure.

FIG. 3 shows the steps that may be performed by the classification scoring module 116, according to some embodiments of this disclosure. At operation 302, the facial regions are normalized. The classification scoring module 116 normalizes the facial regions by resizing the facial regions such that they are the same size. At operation 304, the normalized facial regions are then used by an feature detection algorithm to identify features within the image. For example, a modified ORB algorithm may be used to detect features only on the base layer of the image, rather than the entire pyramid used by traditional ORB algorithms. At operation 306, the feature count identified by the feature detection algorithm is used to score each facial region.

Returning to FIG. 2, at operation 208, the people categorization engine 110 determines whether each identified face is a subject face or crowd face. For example, the people categorization engine 110 may use the face filtering module 118 to process the scores for each face in V(f) to determine whether each face is a crowd face or subject face. Crowd faces are generally non-focused or blurry as compared to subject faces and therefore have less features detected by feature detection algorithms. Therefore, the count of facial features is determined by the classification scoring module 116. The face filtering module 118 separates the faces stored as V(f) into high scoring and low scoring faces. This is done by determining a threshold to use as a basis for whether a score a high scoring face.

The threshold may be generated by using k-means clustering to perform a 2-way clustering technique. In k-means clustering, a number of clusters are initialized. Then, an assignment step is performed for each score to assign the score to the cluster with the closest mean. Then, an update step is performed to make update the mean score for each cluster as well as identify new potential clusters. For a 2-way cluster, a maximum of two clusters are identified through k-means clustering.

In certain embodiments, the faces with scores below the threshold are identified as crowd faces and can be stored in a vector V(c). These faces can be removed from V(f) so that the faces remaining are subject faces. These faces may be removed from V(f) through a number of methods.

At operation 210, optionally the people categorization engine 110 may revalidate the results across other images that have been previously processed. For example, a face may be blurry in an image and have been classified as a crowd face. This face would be found in V(c). However, if the same face has been identified as a subject face in previous images, the face can be moved from V(c) back to V(f). This allows false positives to be eliminated and subjects which are in multiple pictures to be properly identified in cases where a subject face is occasionally out of focus.

At operation 212, the people categorization engine may display the resulting subject faces to the user. In other embodiments, the results V(c) and V(f) may be stored for further use, such as for revalidation.

By identifying a list of crowd faces, V(c), a technical advantage is achieved over existing people categorization algorithms. Specifically, V(c) can be used to eliminate unwanted faces identified through facial detection not only from the input image, but also across a large set of images. Subject faces that may have been inadvertently identified as crowd faces in a particular image can be corrected. This invention provides for a high accuracy filter across a large number of images. In an alternative embodiments, the list of subject faces can be identified, V(s). The this embodiment, the subject faces can be filtered out and removed from V(f), and the resulting list would be considered crowd faces.

Figure 4:
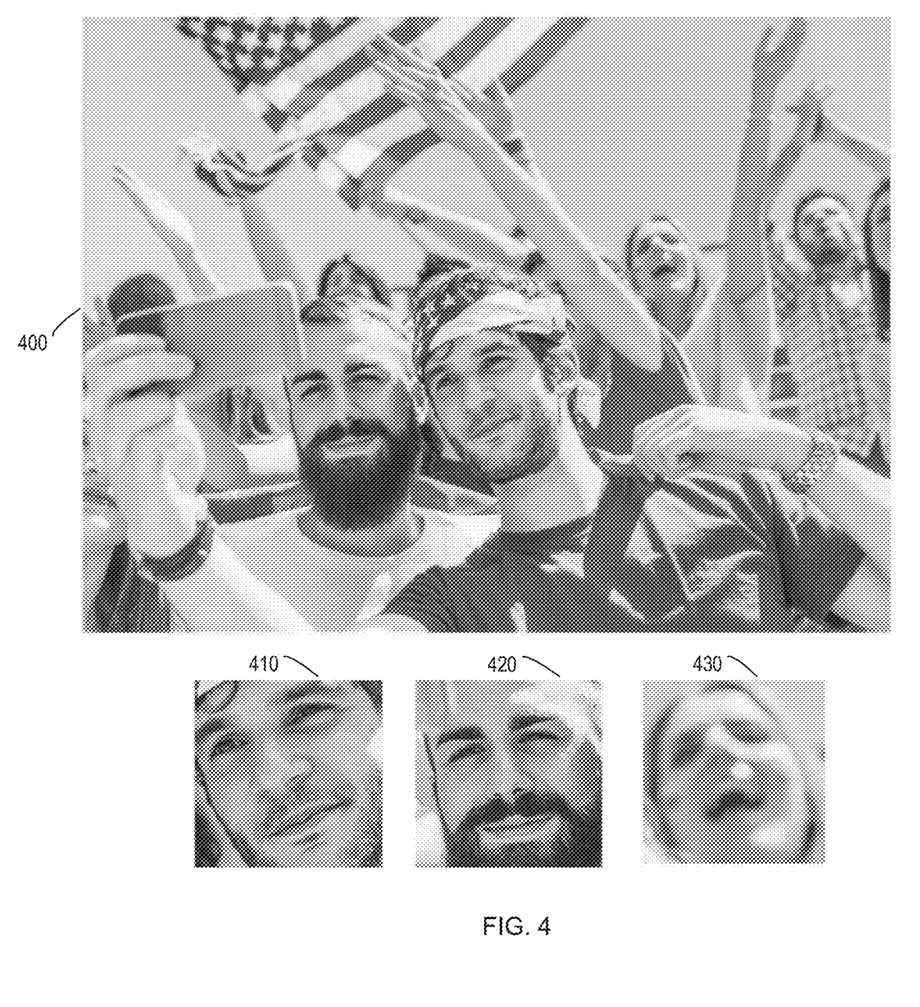
FIG. 4 depicts an example of an input image and results, according to some embodiments of the present disclosure.

FIG. 4 depicts an example image 400 processed by the people categorization engine 110, as described by certain embodiments of this disclosure. The facial detection module 114 can use facial detection algorithms to identify faces in the image. In this example, the facial detection module identifies three faces 410, 420, and 430. These faces are stored by the people categorization engine in a vector V(f) for further processing.

Figure 5:
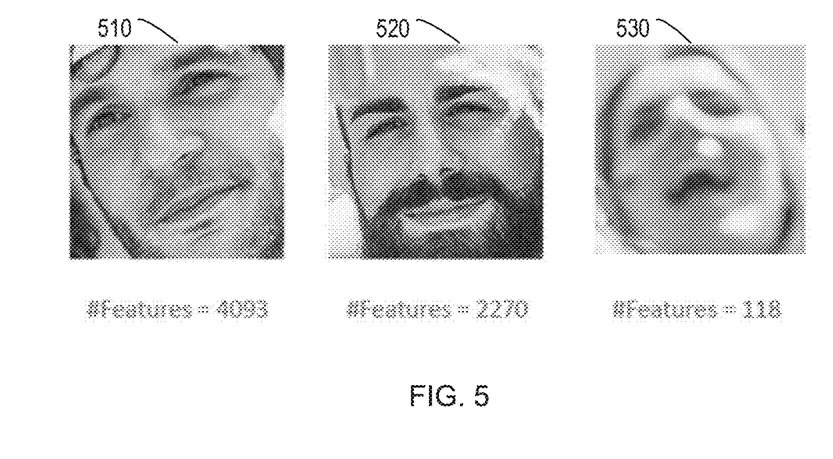
FIG. 5 depicts an example of scoring based on facial features, according to some embodiments of the present disclosure.

FIG. 5 depicts an example of scoring and filtering performed by the people categorization engine 110. In this example, the classification scoring module 116 determines face 510 has a score of 4093, face 520 has a score of 2270, and face 530 has a score of 118. The face filter module 118 then performs clustering to determine that face 510 and 520 belong in a high score cluster while 530 belongs in a low score cluster. A threshold is determined wherein face 510 and 520 are above the threshold while face 530 is below the threshold. Face 530 is placed in V(c) and removed from V(f) to create a separate vector for subject and crowd faces.

Example of a Computing System for Implementing Certain Embodiments

Figure 6:
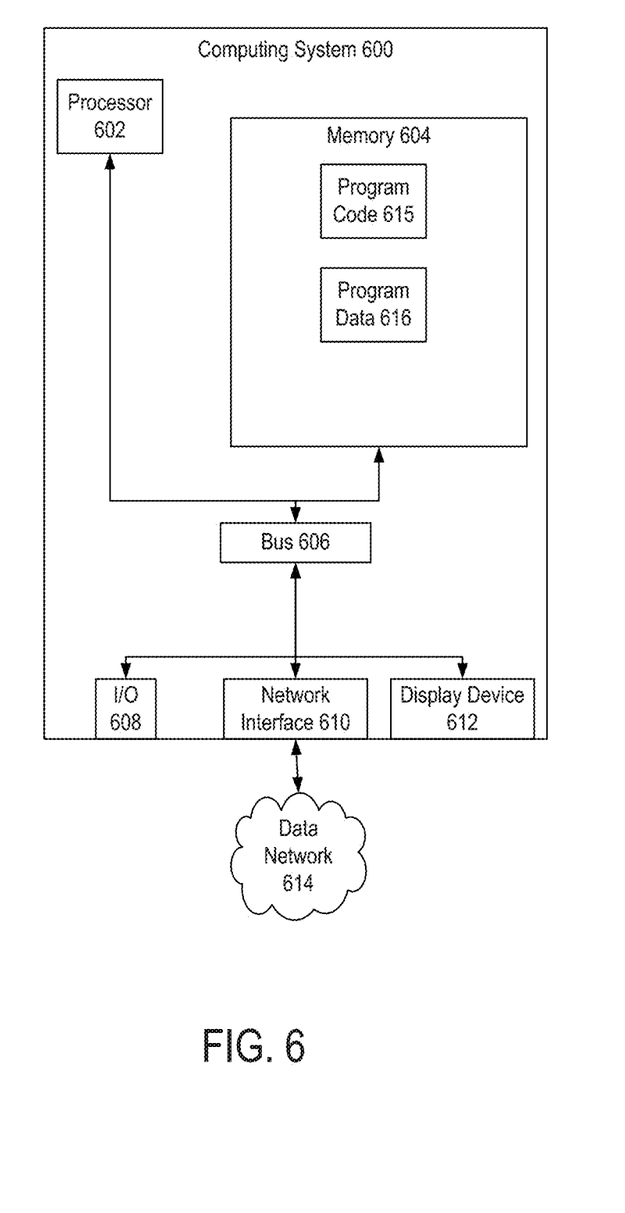
FIG. 6 depicts an example of a computing system for implementing one or more embodiments of the present disclosure.

Any suitable computing system or group of computing systems can be used for performing the operations described herein. For example, FIG. 6 depicts an example of the computing system 600. The implementation of computing system 600 could be used for an image processing computing system 100.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 615, program data 616, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 608. An I/O interface 608 can receive input from input devices or provide output to output devices, such as a presentation device 612. One or more buses 606 are also included in the computing system 600. The bus 606 communicatively couples one or more components of a respective one of the computing system 600.

The computing system 600 executes program code 615 that configures the processor 602 to perform one or more of the operations described herein. Examples of the program code 615 include, in various embodiments, the people categorization engine 110 or other suitable applications that perform one or more operations described herein. The program code may be resident in the memory device 604 or any suitable computer-readable medium and may be executed by the processor 602 or any other suitable processor.

The computing system 600 can access program data 616 (e.g., an input image 112) in any suitable manner. In some embodiments, one or more of these data sets, models, and functions are stored in the same memory device (e.g., one of the memory devices 604). In additional or alternative embodiments, one or more of the programs, data sets, models, and functions described herein are stored in different memory devices 604 accessible via a data network.

The computing system 600 also includes a network interface device 610. The network interface device 610 includes any device or group of devices suitable for establishing a wired or wireless data connection to one or more data networks 614. Non-limiting examples of the network interface device 610 include an Ethernet network adapter, a modem, etc. The computing system 600 is able to communicate with one or more other computing devices via a data network 614 using the network interface device 610. Examples of the data network 614 include, but are not limited to, the internet, a local area network, a wireless area network, a wired area network, a wide area network, and the like.

In some embodiments, the computing system 600 also includes the presentation device 612 depicted in FIG. 6. A presentation device 612 can include any device or group of devices suitable for providing visual, auditory, or other suitable sensory output (e.g., display device 130). Non-limiting examples of the presentation device 612 include a touchscreen, a monitor, a speaker, a separate mobile computing device, etc. In some aspects, the presentation device 612 can include a remote client-computing device that communicates with the computing system 600 using one or more data networks described herein. Other aspects can omit the presentation device 612.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes one or more processing devices performing operations comprising:
    retrieving a first input image from memory;
    determining two or more facial regions in the first input image using a facial detection algorithm;
    identifying features for each facial region of the two or more facial regions;
    determining, from the two or more facial regions in the first input image, a subject face and a crowd face in the first input image based on at least a number of the features for the subject face being more than a number of the features for the crowd face;
    causing a display device to display at least the subject face identified within the first input image;
    retrieving a second input image from the memory;
    determining two or more facial regions in the second input image using the facial detection algorithm;
    identifying features for each of the two or more facial regions in the second input image;
    determining, from the two or more facial regions in the second input image, a second subject face and a second crowd face in the second input image based on at least a number of the features for the second subject face being more than a number of the features for the second crowd face; and
    causing the display device to display at least the second subject face identified within the second input image.

2. The method of claim 1, wherein identifying the features for each facial region of the two or more facial regions in the first input image comprises resizing the facial region to a predetermined size.

3. The method of claim 2, wherein the features for each facial region of the two or more facial regions in the first input image are identified from a base layer of the facial region.

4. The method of claim 1, wherein determining the subject face and the crowd face further comprises:
    obtaining a predetermined threshold by performing k-mean clustering on the numbers of the features for the two or more facial regions in the first input image; and
    determining that the number of the features for the subject face is above the predetermined threshold, and the number of the features for the crowd face is below the predetermined threshold.

5. The method of claim 1, further comprising:
   determining that the crowd face has previously been identified as a previous subject face in a previous input image; and
   based on determining that the crowd face has previously been identified as the previous subject face, determining that the crowd face is a subject face in the first input image.

6. The method of claim 1, wherein identifying the features for each facial region of the two or more facial regions in the first input image is based on at least one of an Oriented Fast Rotated Brief feature detector, a Haar-like feature detector, or a Scale Invariant Feature Transform feature detector.

7. A system comprising:
   a processor; and
   a non-transitory computer-readable medium communicatively coupled to the processor,
   wherein the processor is configured to execute program code stored in the non-transitory computer-readable medium and thereby perform operations comprising:
      retrieving a first input image from memory;
      determining two or more facial regions in the first input image using a facial detection algorithm;
      identifying features for each facial region of the two or more facial regions in the first input image;
      determining, from the two or more facial regions in the first input image, a subject face and a crowd face in the first input image based on at least a number of the features for the subject face being more than a number of the features for the crowd face;
      causing a display device to display at least the subject face identified within the first input image;
      retrieving a second input image from the memory;
      determining two or more facial regions in the second input image using a facial detection algorithm;
      identifying features for each facial region of the two or more facial regions in the second input image;
      determining, from the two or more facial regions in the second input image, a second subject face and a second crowd face in the second input image based on at least the number of the features for the second subject face being more than the number of the features for the second crowd face; and
      causing a display device to display at least the second subject face identified within the second input image.

8. The system of claim 7, wherein identifying the features for each facial region of the two or more facial regions in the first input image comprises resizing the facial region to a predetermined size.

9. The system of claim 8, wherein identifying the features for each facial region of the two or more facial regions in the first input image is based on a base layer of the facial region.

10. The system of claim 7, wherein determining the subject face and the crowd face further comprises obtaining a predetermined threshold based on k-mean clustering of the numbers of the features for the two or more facial regions in the first input image, and determining that the number of features for the subject face is above the predetermined threshold, and the number of features for the crowd face is below the predetermined threshold.

11. The system of claim 7, further comprising:
    determining that the crowd face has previously been identified as a previous subject face in a previous input image; and
    based on determining that the crowd face has previously been identified as the previous subject face, determining that the crowd face is a subject face in the first input image.

12. The system of claim 7, wherein identifying the features for each facial region of the two or more facial regions in the first input image is based on at least one of an Oriented Fast Rotated Brief feature detector, a Haar-like feature detector, or a Scale Invariant Feature Transform feature detector.

13. A non-transitory computer-readable medium having program code that is stored thereon, the program code executable by one or more processing devices for performing operations comprising:
    accessing a first input image from a memory device;
    filtering the first input image to identify subject faces, wherein filtering the first input image comprises:
       determining two or more facial regions in the first input image using a facial detection algorithm;
       identifying features for each facial region of the two or more facial regions in the first input image; and
       determining, from the two or more facial regions in the first input image, a subject face and a crowd face in the first input image based on at least a number of the features for the subject face being more than a number of the features for the crowd face;
    causing a display device to display at least the subject face identified within the first input image;
    retrieving a second input image from the memory device;
    determining two or more facial regions in the second input image using the facial detection algorithm;
    identifying features for each facial region of the two or more facial regions in the second input image;
    determining a second subject face and a second crowd face in the second input image based on at least a number of the features for the second subject face being more than the number of the features for the second crowd face; and
    causing the display device to display at least the second subject face identified within the second input image.

14. The non-transitory computer-readable medium of claim 13, wherein identifying the features for each facial region of the two or more facial regions in the first input image comprises resizing the facial region to a predetermined size.

15. The non-transitory computer-readable medium of claim 14, wherein identifying the features for each facial region of the two or more facial regions in the first input image is based on a base layer of the facial region.

16. The non-transitory computer-readable medium of claim 13, wherein determining the subject face and the crowd face further comprises obtaining a predetermined threshold based on k-mean clustering of the numbers of the features for the two or more facial regions in the first input image, and determining that the number of the features for the subject face is above the predetermined threshold, and the number of the features for the crowd face is below the predetermined threshold.

17. The non-transitory computer-readable medium of claim 13, the program code further comprising:
    determining that the crowd face has previously been identified as a previous subject face in a previous input image; and
    based on determining that the crowd face has previously been identified as the previous subject face, determining that the crowd face is a subject face in the first input image.

* * * * *